United States Patent [19]
Phillips

[11] 3,978,914
[45] Sept. 7, 1976

[54] ROTARY CERAMIC HEAT EXCHANGER MOUNTING

[75] Inventor: William A. Phillips, Comstock Park, Mich.

[73] Assignee: Granco Equipment, Inc., Grand Rapids, Mich.

[22] Filed: May 9, 1975

[21] Appl. No.: 576,215

Related U.S. Application Data

[62] Division of Ser. No. 400,313, Sept. 24, 1973.

[52] U.S. Cl. ........................................ 165/7; 165/8; 64/30 A; 403/261; 403/370; 403/372
[51] Int. Cl.² ........................................ F28D 19/00
[58] Field of Search ................................ 165/7–10; 64/30 E, 30 A; 403/259–261, 369, 370, 372, 257

[56] References Cited
UNITED STATES PATENTS

| | | | |
|---|---|---|---|
| 380,787 | 4/1888 | Catlin | 403/261 |
| 804,778 | 11/1905 | Smith | 64/30 A |
| 3,774,675 | 11/1973 | Yoshiro | 165/8 |

FOREIGN PATENTS OR APPLICATIONS

| | | | |
|---|---|---|---|
| 814,988 | 9/1951 | Germany | 403/261 |

*Primary Examiner*—Albert W. Davis, Jr.
*Attorney, Agent, or Firm*—McGarry & Waters

[57] ABSTRACT

A heat exchanger and mounting structure therefor for use in connection with incinerators, for example, the heat exchanger formed of a ceramic wheel with a central core and an annular portion with gas passages extending axially therethrough. The ceramic wheel is mounted at the central core with a mounting means which comprises first and second wedge members in abutting relationship with opposite sides of the core. Means bias the wedge members towards each other so that the core is resiliently held under compression between the two wedge members to eliminate tension stresses on the ceramic wheel due to thermal expansion differences between the ceramic wheel and the mounting structure therefor. The mounting structure includes a first shaft secured to the first wedge member and a second shaft, tubular in shape and concentrically mounted on the first shaft, the second shaft being secured to the second wedge member. The shafts are supported on the cool side of the heat exchanger wheel by a pair of bearings. Cooling air is circulated through the interior of both of the shafts and through the bearings to keep the mounting shafts and the bearings as cool as possible.

10 Claims, 3 Drawing Figures

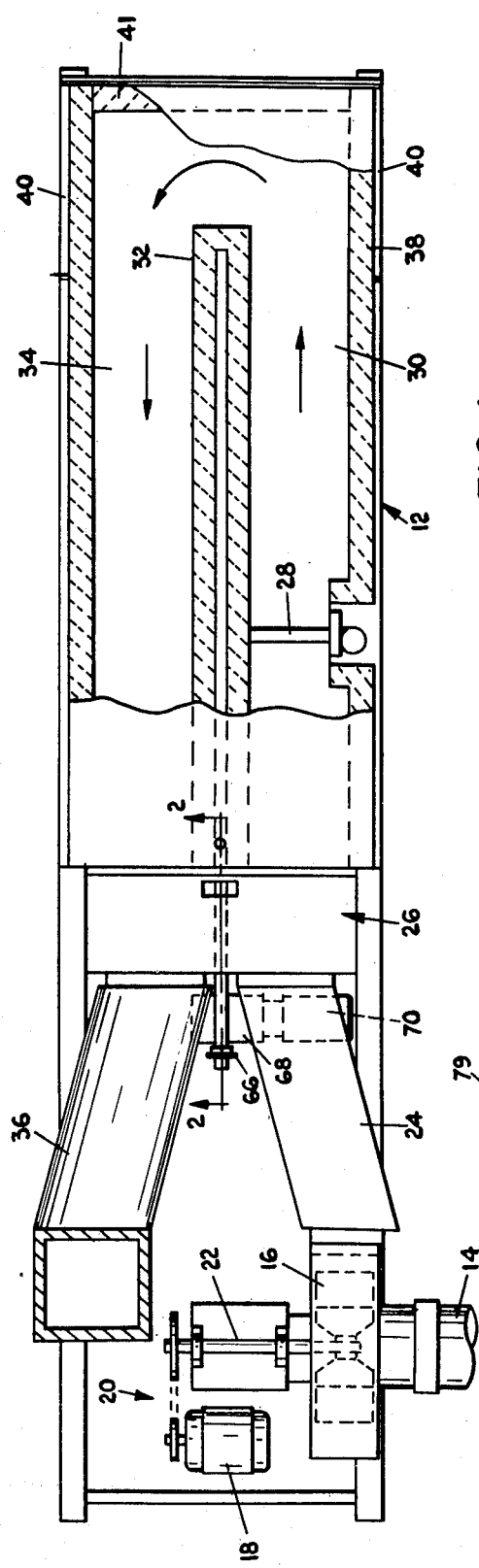
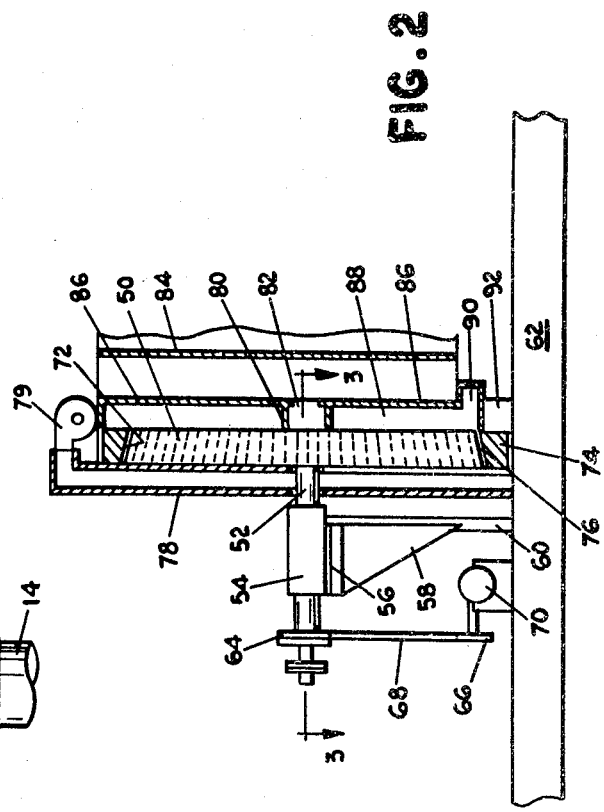

ROTARY CERAMIC HEAT EXCHANGER MOUNTING

This is a division of application Ser. No. 400,313 filed Sept. 24, 1973.

BACKGROUND OF THE INVENTION

1. Field of the Invention

This invention relates to heat exchangers and mounting structures therefor. In one of its aspects, the invention relates to a mounting structure for a ceramic rotary heat exchanger.

2. State of the Prior Art

Incineration of combustible fumes is a problem currently facing many industries such as lithography, smoke houses, paint shops, etc. It has been found that combustion of these fumes at the present time is the most effective way to eliminate the fumes from these industrial processes although the cost of fuel for such incineration has been considerable. Efforts have been made to more completely recoup the heat enegy required to raise the fume and air mixture to incineration temperatures. For example, see U.S. Pat. No. 3,706,455 to Charles B. Gentry for FUME INCINERATION, and U.S. Pat. No. 3,670,667 to William A. Phillips for INCINERATOR WITH EXTENDED HEAT EXCHANGE SURFACE.

It has been proposed to use a rotary heat exchanger to recover the heat from hot exhaust gases for preheating the fume-containing gases which are to be incinerated. Rotary regenerators have been used for many years for recuperating heat from hot gases. In recent years, special ceramic materials have been developed for use in these rotary regenerators. The ceramic materials have a very low coefficient of expansion and find particular utility in the automotive field in connection with turbine engines. An example of such ceramic material is Cer-Vit material which is manufactured and sold by Owens-Illinois of Toledo, Ohio.

Some of the ceramic heat exchanger structures have been of the radial flow type in that the gases flow radially through a cylindrical body. Thus, the passages extend radially through the cylindrical body. Such a heat exchanger is disclosed in the U.S. Pat. No. 2,598,182 to Kolb. In the Kolb heat exchanger structure, the cylindrical heat exchanger is supported at the edges thereof by annular bearings. The bearings are provided both on the "hot side" and the "cold side" of the heat exchanger and provisions can be made for circulating cooling air through chambers adjacent to the bearing structure. The bearing structure is metallic and has a greater coefficient of expansion than does the ceramic heat exchanger material. Accordingly, thermal stresses of a radical nature may be experienced by the relatively thermally stable ceramic core due to thermal expansion of the bearing members.

In other types of rotary heat exchangers, the gases pass axially through the ceramic core. The heat exchanger wheel is mounted for rotation about a central axis. In some cases the heat exchanger is supported at the peripheral face thereof and the rotational forces are applied to the peripheral face of the heat exchanger. Such a drive mechanism is disclosed in the U.S. Pat. No. 3,456,518 to Topouzian. In such drive mechanisms, sealing of the periphery of the heat exchanger may be a problem.

More conventionally, it is desirable to support the ceramic core in a central portion and apply the drive to the central core mounting. However, differences in thermal expansion characteristics of the mounting structure and the ceramic heat exchanger wheel may cause failure of the wheel. Whereas the ceramic material is relatively strong under compression, it is relatively weak in tension. In order to obtain the required strength to mount and rotate the wheel, strong metals, such as steel, are used to mount the heat exchanger wheel. If the heat exchanger wheels are conventionally mounted on the metal mounting shafts, expansion of the metal mounting shafts due to heat may cause cracking and failure of the ceramic heat exchanger wheel.

Another problem with mounting the ceramic heat exchanger on a central support is that the bearings which support the rod usually have a relatively short life. Conventionally, bearings have been mounted on each side of the heat exchanger. The bearing on the "hot side" of the heat exchanger is subject to seizing as a result of the intense heat that builds up in the bearing. This is especially true for heat exchangers for hotter gases as in incinerators, for example, where the temperature may reach 1600°F.

Bracken, Jr. et al in U.S. Pat. No. 3,476,173 discloses a rotary ceramic heat exchanger wheel mounted on a central support shaft which is journaled in a bearing structure including a pair of bearings mounted at the cool side of the heat exchanger. The wheel mounting structure includes a hub which is driven by the central shaft with the hub having a plurality of fingers extending into recesses in the central part of the ceramic heat exchanger wheel. The fingers are secured to pads within the recesses to evenly distribute the load between the hub and the heat exchanger wheel. Clearance is maintained between the fingers of the hub and the ceramic wheel with the pads filling the space between the fingers and the wheel. Although the bearings are positioned on the cool side of the heat exchanger wheel, they still may have a tendency to overheat.

SUMMARY OF THE INVENTION

According to the invention, a ceramic heat exchanger is mounted on a central shaft through which the heat exchanger is driven. A first wedge member abuts one side of the core of the ceramic heat exchanger wheel and a second wedge abuts the other side of the core. Means are provided for biasing the wedge members toward each other so that the core is resiliently held by the first and second wedge members under compression. In this manner, the wheel is firmly gripped and the gripping means automatically compensates for differences in thermal expansion of the wheel. Desirably, the wheel has tapered conical surfaces at the core and the wedge members have flared conical collars complementary to the wheel surfaces.

The first wedge member is secured to a first shaft, preferably hollow, which extends through the ceramic core. The second wedge member is secured to a tubular shaft which is mounted concentrically with respect to the first shaft. Springs are mounted on the end of the first shaft and abut the second shaft so that the two shafts are biased axially with respect to each other. A nut or other suitable means is provided on the end of the first shaft for maintaining and adjusting the tension in the springs.

Also according to the invention, cooling fluid is supplied to the shafts which mount the heat exchanger wheel. Desirably, the shafts are mounted on a pair of bearings a spaced distance from the cool side of the ceramic heat exchanger wheel. The cooling fluid is preferably circulated through the bearings as well as through the support shafts.

The invention provides a means for mounting the ceramic wheel at the central portion thereof wherein thermal tension stresses on the ceramic wheel are avoided. Further, the bearings are kept cool so as to avoid premature failure due to heat.

BRIEF DESCRIPTION OF THE DRAWINGS

The invention will now be described with reference to the accompanying drawings in which:

FIG. 1 is a plan view, partially broken away, showing an incinerator structure according to the invention;

FIG. 2 is a partial sectional view taken along lines 2—2 of FIG. 1; and

DESCRIPTION OF THE PREFERRED EMBODIMENT

Figure 3:
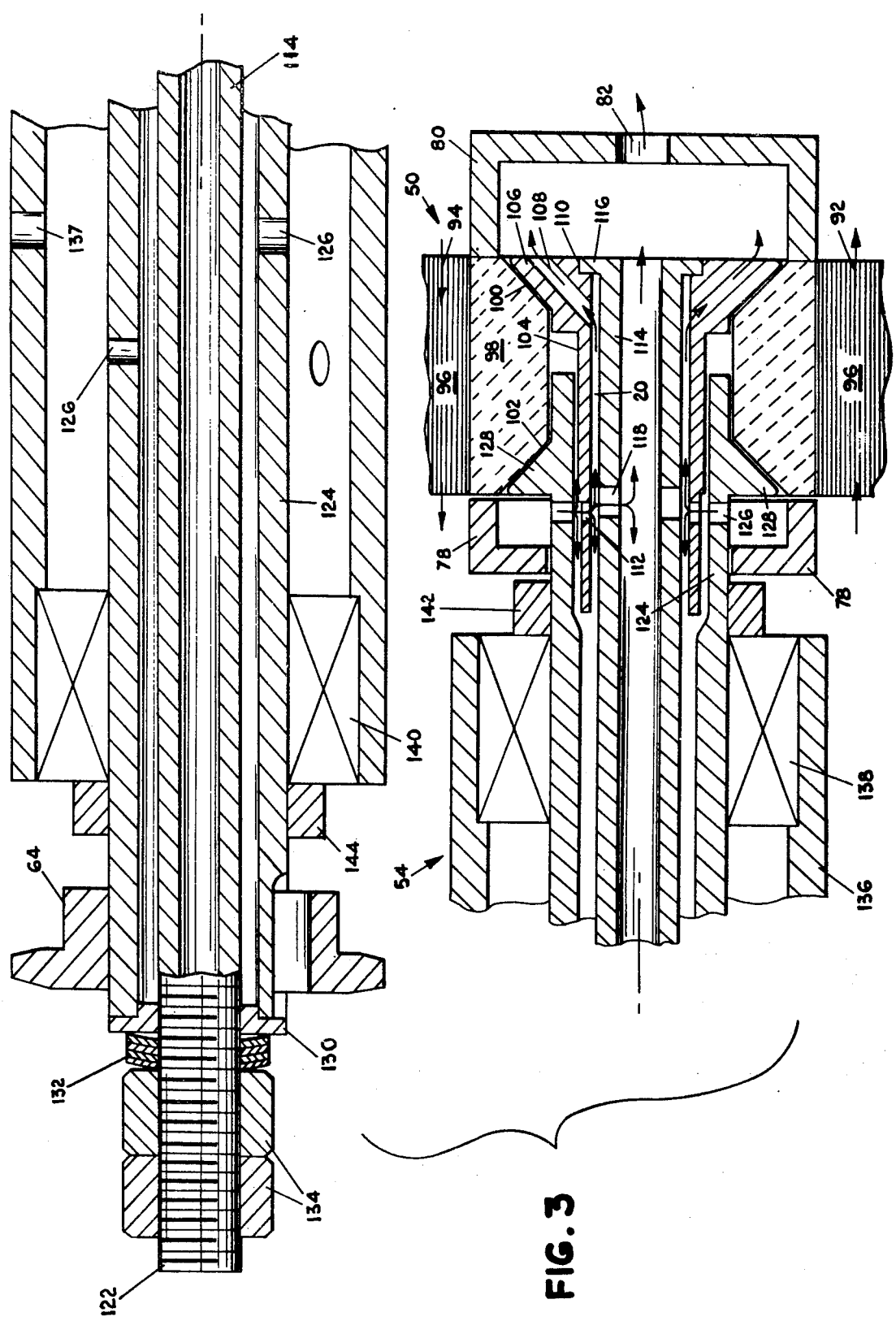
FIG. 3 is an enlarged detail sectional view taken through lines 3—3 of FIG. 2.

Referring now to the drawings, and to FIG. 1 in particular, there is shown an incinerator 12 which is supplied with a fume and air mixture through a fume duct 14. The fume and air mixture may come from a drying oven for lithographed sheets, for example, may come from a smoke house, or any other type of industrial process in which combustible fumes are generated.

A fan 16 draws the fume and air mixture from the fume duct 1 and forces the mixture through an intake duct 24. The fan 16 is of conventional structure and is driven by a motor 18 through a pulley assembly 20 and a drive shaft 22. The fume and air mixture is forced from the intake duct 24 through a rotary regenerative heat exchanger designated generally by the numeral 26 and into one side of the tubular incinerator 12. The tubular incinerator is formed by an outer annular metal wall 40 and an inner refractory wall 38. An end wall 42 seals the end of the tubular incinerator 12. A vertical baffle 32 which can be provided with an air-cooled central portion, divides the interior of the tubular incinerator 12 into a combustion chamber 30 and a residence chamber 34. A burner 28 which, desirably, is a gas-fired grid type burner, is provided in the combustion side of the tubular incinerator 12 to heat the fume and air mixture entering the combustion chamber 30 to a temperature sufficient for oxidation of the fumes in the fume and air mixture. An example of a suitable burner is disclosed in the U.S. Pat. No. 3,524,632 to Davies. The combusted gases, after passing around the end of the baffle 32 and through the residence chamber 34, pass through the other side of the rotary heat exchanger 26 and through an exhaust duct 36 through which they are exhausted to the atmosphere.

Reference is now made to FIG. 2 which shows a vertical sectional view through the heat exchanger structure. A rotary heat exchanger wheel 50, formed of a honycomb ceramic material such as Cer-Vit Material having passageways axially passing therethrough, is mounted on a shaft assembly 52 and journalled in a bearing structure 54. An adjustable support 56 is secured to the bearing structure for moving the wheel axially with respect to the housing therefor. An angle iron 58 secured to an upright support 60 on horizontal beam 62 is secured at an upper portion to the adjustable support 56 for securely retaining the bearing structure 54, and thus the rotary heat exchanger wheel 50 in a given adjusted position.

A sprocket 64 is keyed to the outer end of the shaft assembly 52. A motor 70 has an output shaft mounting a sprocket 66 which drives the sprocket 64 and shaft assembly 52 through a chain 68. Thus, the rotary heat exchanger wheel 50 is rotatably driven by the motor 70 through the shaft assembly 52.

The rotary heat exchanger 52 has an axially tapered circumferential surface 72 which mates with an inwardly tapered complementary surface 76 of an annular seal block 74. Thus, the gap between the rotary heat exchanger wheel 50 and the annular seal block 74 can be adjusted by axial movement of the rotary heat exchanger wheel 50. As disclosed in the copending application of Charles B. Gentry entitled FUME INCINERATOR AND SEAL STRUCTURE THEREFOR, filed of even date herewith, the adjustment can be made by axial movement of the bearing structure 54 with respect to the adjustable support 56.

A vertical channel 78 connected to a fan 79 is provided at the outside edge of the rotary heat exchanger wheel 50 for supplying cooling air to the shaft assembly 52 and to a purge chamber at the bottom of the vertical channel 78. The chamber 78 is preferably made from a thermally stable material, such as bubble alumina, and forms a floating seal with one face of the heat exchanger wheel 50. A horizontal conduit 80 provides a passageway 82 for passage of cooling air through the shaft assembly 52 and into a vertical conduit 84 which is open to the atmosphere. A vertical channel 86 is provided at the bottom of the heat exchanger wheel 50 and provides a purge chamber 88 for reception of purge air which passes through the bottom portion of the wheel as the passages of the wheel rotate from the fume and air section to the exhaust section. In other words, the fume and air mixture remaining in the passages of the heat exchanger wheel as the heat exchanger wheel rotates to the exhaust zone is purged from the wheel by the air which passes down channel 78 through the bottom portion of the wheel and into the purge chamber 88. A laterally extending conduit 90 is provided at the bottom of the purge chamber 88 to pass the purge gases into admixture with the fume and air mixture in the combustion chamber 30. In this manner, minor amounts of fume and air mixture are prevented from passing to the exhaust through the heat exchanger wheel and thereby bypassing the combustion chamber 30.

The vertical channel 86 is desirably made from a stable ceramic material such as bubble alumina. This channel 86 extends above the horizontal conduit 80 to the top of the wheel and provides a close floating seal at the hot side of the wheel 50. The channel 86 is not in contact with the wheel 50 but is very closely adjacent thereto, forming a gap seal therewith.

The channels 78 and 86 thus form seals along opposite faces of the wheel 50, thereby sealing the fume and air conduit from the exhaust gas conduits. These seals substantially prevent the fume and air mixture from bypassing the incinerator and seeping into the exhaust gas conduit.

Reference is now made to FIG. 3 for a detailed description of the shaft assembly 52 and the cooling conduits associated therewith. The rotary heat exchanger wheel 50 has an annular section formed of honeycomb air passages 96. The heat exchanger wheel 50 also has a solid central core section 98 having outwardly flared conical surfaces 100 and 102. The fume and air mixture passes axially through the rotary heat exchanger wheel 50 at one side of the housing therefor in the direction indicated by arrows 92 and the hot exhaust gases pass axially through the heat exchanger at the opposite side of the housing therefor in a direction indicated by arrows 94.

The shaft assembly 52 comprises a sleeve 104 having a flared conical end 106 with axial openings 108 for passage of air therethrough into the passageway 82. The flared conical end 106 has an annular recess 110 at the outside central portion thereof. Openings 112 are provided along the sleeves 104 for passage of air therethrough into the interior thereof. A tubular shaft 114 of smaller outer diameter than the inner diameter of sleeve 104 has an up-set end which forms a ring 116 of an outer diameter to fit within the annular recess 110. The tolerances between the sleeve 104 and the shaft 114 are such as to form an annular passageway 120 for passage of cooling air. A plurality of openings 118 are provided along the length of the tubular shaft 114 to permit air to freely pass into the center portion thereof from the annular passage 120 and from holes 112. The tubular shaft 114 is threaded at end 122 opposite the ring 116.

A tubular outer shaft 124 is mounted concentrically on the shaft 114 and has openings 126 at the vertical channel 78 to permit the cooling air to pass from the vertical channel 78 into the interior of the tubular outer shaft 124 and through holes 112 and 118. Openings 126 are also provided in the tubular shaft 124 within the bearing structure 54 for passage of air into the interior thereof. A flared collar 128 is secured to the tubular outer shaft 124 and has a conical surface which bears against the outwardly flared conical surface 102 of core 98. A ring 130 is mounted on the tubular shaft 114 at an end opposite the ring 116 and bears against the outer end of the tubular outer shaft 114. Belleville springs 132 abut the ring 130 and are tensioned by a pair of locking nuts 134 which threadably engage the threaded end 122 of the tubular shaft 114. In this manner, the tubular outer shaft 124 is biased to the left (as viewed in FIG. 3) with respect to the tubular inner shaft 114 and against the core 98 of the wheel 50. In this manner, the core 98 of the rotary heat exchanger wheel 50 is compressed between the flared conical end 106 of the sleeve 104 and the flared collar 128 on the tubular outer shaft 124. This compression mounting is important with respect to ceramic wheels in that the strength of the ceramic material is far greater in compression than in tension. The compression mounting provides a safe, easy manner by which the ceramic heat exchanger wheel 50 can be fixed on a metal shaft to which rotational power is supplied without the conventional types of mountings. The expansion characteristics of the ceramic core 98 are substantially different from those of the metal shaft assembly 52. However, any differential in thermal expansion between the core 98 and the shaft assembly 52 is taken up by the Belleville springs 152 and results in a difference in the compressive load on the core 98. In other words, radial expansion of the metal mountings does not result in radial stresses on the ceramic wheel 50. In more conventional systems, expansion of a tight fitting metal shaft would cause expansion of the core outwardly, thereby stressing the wheel in tension. The likely result of this stressing is cracking or failure of the heat exchange wheel 50.

The bearing structure 54 comprises a cylindrical housing 136 having a plurality of openings 137. A pair of bearings 138 and 140 are mounted within the cylindrical housing 56 and are retained fixed within the housing and fixed with respect to the tubular outer shaft 124 by a pair of retaining rings 142 and 144 respectively.

In operation, as the wheel rotates, heat from the hot exhaust gases are transferred to the incoming fume and air mixture to preheat the same for oxidation within the combustion chamber 30. Further heat is supplied to the fume and air mixture by the burner 28 to bring the fume and air mixture up to oxidation temperature. Substantially all of the fumes in the mixture are incinerated as they pass through the combustion chamber, around the end of the baffle 32 and through the residence chamber 34. The hot exhaust gases transfer substantial amounts of heat to the rotary heat exchanger wheel 50 to preheat the incoming fume and air mixture. The rotary heat exchanger wheel 50 is rotated continuously by motor 70 which supplies power to the shaft assembly 52. Because the core 98 of the heat exchanger wheel 50 is compressed between the flared conical end 106 and the flared collar 128, it is held tightly by the shaft assembly 52 and rotates therewith. As the shaft rotates, cooling air, supplied to the vertical channel 87 passes through openings 126 in outer tubular shaft 124 and thereafter into the annular space 120, through axial openings 108 and into the conduit 80. Also, the air flows through the interior of the tubular shaft 114 and into the horizontal conduit 80 into passageway 82. Still further, the cooling air flows axially outwardly through the interior of the tubular shaft 114 and through the annular space 120 outwardly into the cylindrical housing 136 of the bearing structure 54 and through openings 137. The air within the inner tubular shaft 114 will pass through the outer end thereof.

Air supplied to the vertical channel 78 is forced through portions of the wheel 50 adjacent the bottom of the channel 78 to channel 88. The fume and air mixture is thus purged from the wheel 50 as it rotates and the mixture, thus purged, is passed to the incinerator combustion chamber 30 through laterally extending conduit 90.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a heat exchanger for hot gases and the like wherein a ceramic wheel has a central core and an annular portion with gas passages extending axially therethrough, mounting means extend through said core for rotation of said wheel about a central axis thereof, and means rotate said mounting means to thereby rotate said wheel, the improvement in said mounting means comprising:
   a first wedge member abutting one side of said core and adapted to apply a substantially compressive force to the one side of the core;
   a second wedge member abutting an opposite side of said core and adapted to apply a substantially compressive force to the opposite side of the core; and
   means for biasing said wedge members together whereby said core is resiliently held substantially under compression between said two wedge members, whereby changes in dimensions of said core and said mounting means are compensated for by said biasing means and tensional stresses on said core due to said mounting means are minimized.

2. A heat exchanger according to claim 1 wherein said biasing means includes a first shaft secured to said first wedge member and extending through said core, a second shaft, tubular in shape and concentrically mounted on said first shaft and secured to said second wedge member, and means axially biasing said first shaft with respect to said second shaft.

3. A heat exchanger according to claim 2 wherein said axial biasing means comprises spring means mounted on said first shaft and abutting the end of said second shaft, and means adjustably secured to the end of said first shaft abutting said spring means for adjusting the tension in said spring means.

4. A heat exchanger according to claim 2 wherein said first shaft is also tubular and further comprising means for circulating cooling fluid through the interior of said first and second shafts.

5. A heat exchanger according to claim 2 and further comprising means to circulate cooling fluids through said second shaft to minimize the temperature of said first shaft.

6. A heat exchanger according to claim 5 wherein said mounting means further comprises first and second bearing means supporting said second shaft on one side of said ceramic wheel, whereby said first and second shafts rotate in said first and second bearing means and said bearing means are maintained relatively cool by said cooling fluid.

7. A heat exchanger according to claim 6 and further comprising means to circulate said cooling fluid through said first and second bearings.

8. A heat exchanger according to claim 6 wherein said rotating means includes means for rotating said first and second shafts.

9. A heat exchanger according to claim 1 wherein said core has conical surfaces and said wedge members comprise conical sleeves which abut said conical surfaces of said core.

10. A heat exchanger according to claim 1 and further comprising an annular gap seal surrounding the circumferential surface of said ceramic wheel.

* * * * *